Nov. 8, 1949 A. J. GETZ 2,487,701
MECHANISM FOR RAISING AND LOWERING
FRAMES OF BOAT TRAILERS
Filed Aug. 13, 1948 3 Sheets-Sheet 1
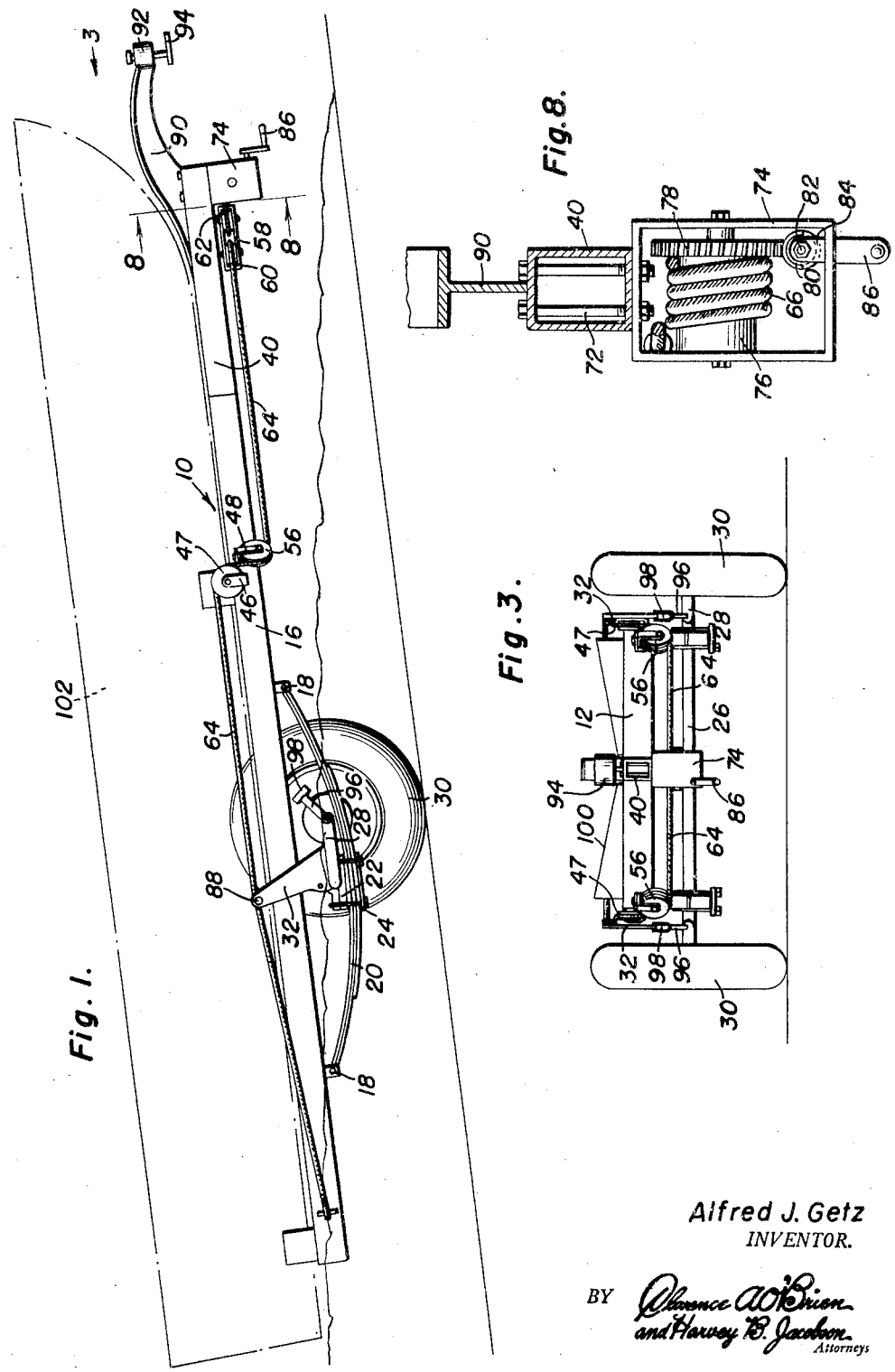
Alfred J. Getz
INVENTOR.

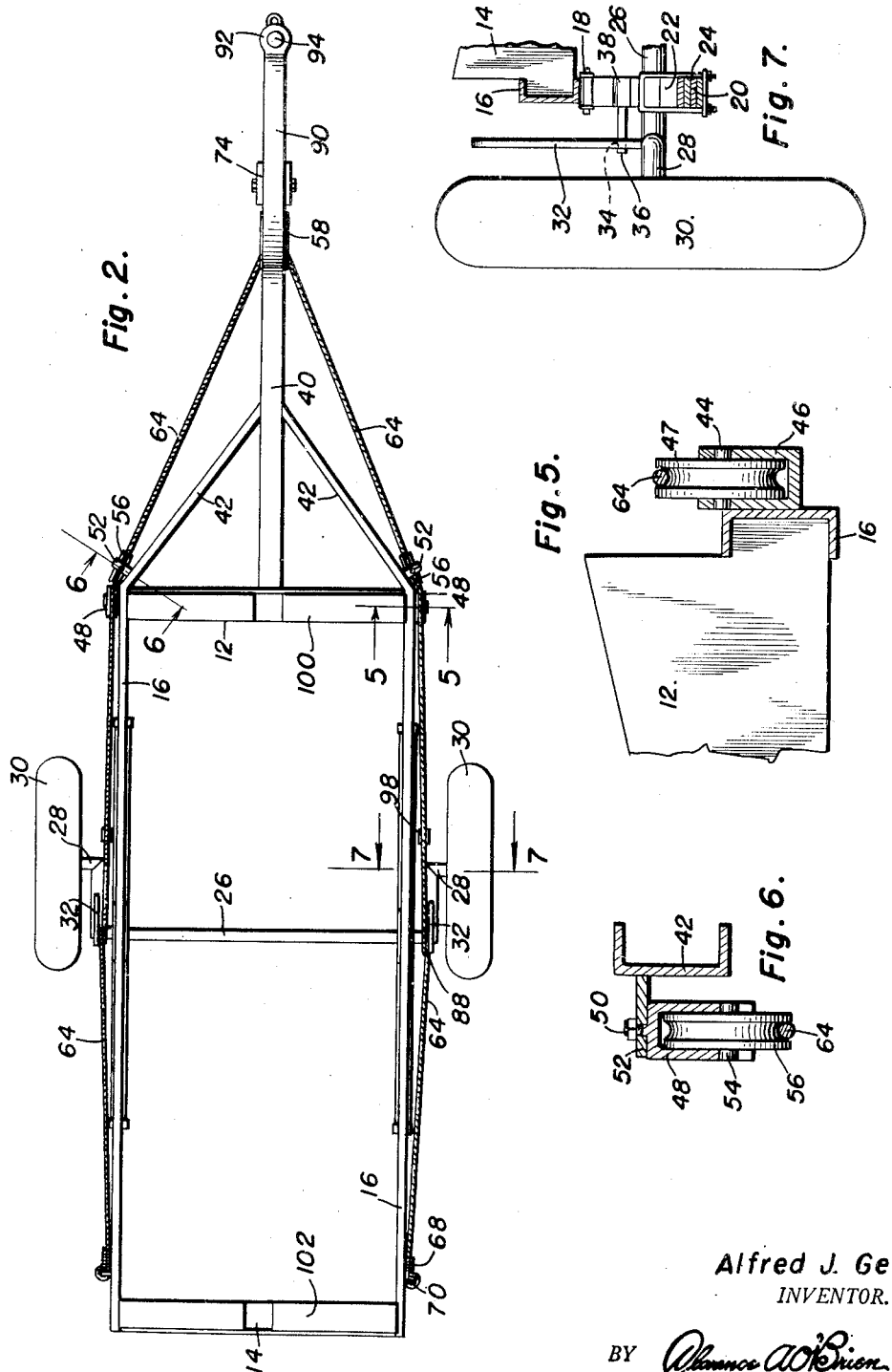

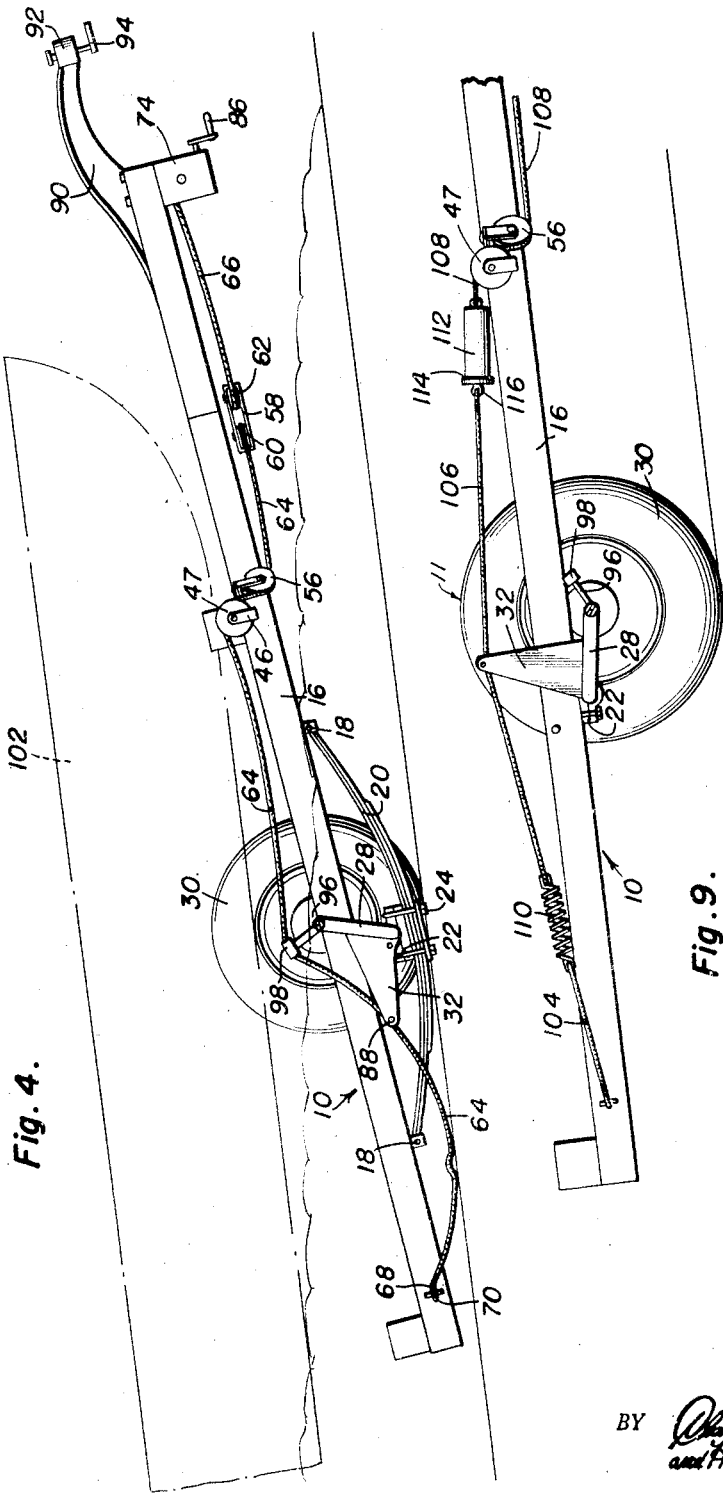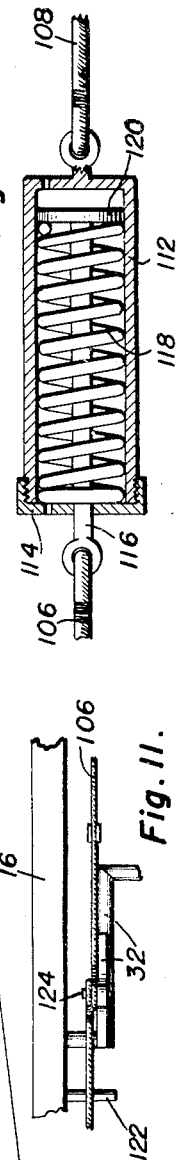
Alfred J. Getz
INVENTOR.

Patented Nov. 8, 1949

2,487,701

UNITED STATES PATENT OFFICE 2,487,701

MECHANISM FOR RAISING AND LOWERING FRAMES OF BOAT TRAILERS

Alfred J. Getz, Kalispell, Mont.

Application August 13, 1948, Serial No. 44,095

6 Claims. (Cl. 280—44)

This invention relates to new and useful improvements in trailers and the primary object of the present invention is to provide a boat supporting frame and embodying novel and improved means for selectively raising and lowering the frame so that a boat may be hauled or removed in a convenient manner.

Another important object of the present invention is to provide a boat trailer including a rotatable wheel supporting shaft disposed relative to a frame, said shaft having cantilever end portions, and manually operated means for rotating said shaft to effect a raising or lowering of the frame.

A further object of the present invention is to provide a boat trailer including a boat supporting frame and novel and improved frame lifting means which are quickly and readily manipulated in a convenient manner for raising the frame to a predetermined height.

Yet another object of the present invention is to provide a boat trailer including a frame and a novel and improved locking means for retaining the frame in a raised position so that the present invention may be towed by a suitable vehicle.

A still further aim of the present invention is to provide a boat trailer that is simple and practical in construction, strong and reliable in use, small and compact in structure, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view of the present invention, and showing the frame in a raised and locked position;

Figure 2 is a top plan view of Figure 1;

Figure 3 is an end view of Figure 1, taken substantially in the direction of arrow numbered 3 in Figure 1;

Figure 4 is a similar view of Figure 1, and showing the frame in an unlocked and lowered position;

Figure 5 is an enlarged transverse vertical sectional view taken substantially on the plane of section line 5—5 of Figure 2;

Figure 6 is an enlarged vertical sectional view taken substantially on the plane of section line 6—6 of Figure 2;

Figure 7 is an enlarged transverse vertical sectional view taken substantially on the plane of section line 7—7 of Figure 2;

Figure 8 is an enlarged transverse vertical sectional view taken substantially on the plane of section line 8—8 of Figure 1;

Figure 9 is a side elevational view of the present invention in slightly modified form, and showing the frame in a raised and locked position;

Figure 10 is an enlarged longitudinal vertical sectional view showing the resilient connector used in conjunction with that embodiment of the invention illustrated in Figure 9; and, Figure 11 is a fragmentary top plan view taken substantially in the direction of arrow numbered 11 in Figure 9.

Referring now to the drawings in detail, and more particularly to Figures 1-8 inclusive, wherein there is disclosed one embodiment of the present invention, the numeral 10 represents a substantially rectangular and open frame generally, including a forward end or cross member 12, a rear end or cross member 14, and a pair of spaced parallel side members or longitudinal beams 16.

Pivotally secured to the under surfaces of the side members 16, as at 18, are the ends of a pair of longitudinally disposed, arcuate leaf springs 20 that support suitable bearings 22 which are adjustably and removably secured to the springs 20 by U-shaped anchor bolts 24.

Removably supported by the bearings 22, is a transverse shaft 26 having cantilever crank portions 28 at the ends thereof that support wheels 30.

Rigidly secured by welding or the like to the shaft 26, and more particularly the crank portions 28 thereof, are lateral projections or arms 32 that are provided with apertures 34 which receive removable locking pins 36. The locking pins 36 engage sleeves 38, integrally formed with the bearings 22 to normally retain the projections 32 in a raised position with the crank portions disposed in a plane spaced to and substantially parallel with the frame 10, and the frame 10 in a raised position.

Rigidly attached to the central portion of the forward end member 12, is one terminal of a draw bar 40 that is braced to the end member 12 by preferably channel shaped bracing straps 42.

Pivotally mounted on shafts 44 between the leg portions of U-shaped members 46 that are fixed to the forward terminals of the side members 16, are forward pulleys 47 which are disposed slightly above and to one side of further U-shaped members 48 that are removably secured by fasteners 50 to lugs 52 which are rigidly attached to the members 42. These latest U-shaped members 48 support shafts 54 on which there are journaled for rotation further pulleys 56.

Rotatably supported by the pulley frame 58, is a pair of pulleys 60 and 62, one of which, for example pulley 60 engages a rear flexible element or actuating cable 64 and the remaining terminal of which, namely pulley 62, engages a forward length of cord or cable 66.

The ends 68 of the cable 64 extend rearwardly along the side members 16, engaged under and over the pulleys 56 and 47, and are anchored as at 70 to the side members 16 adjacent the rear terminals thereof, as shown best in Figure 4 of the drawings.

Removably secured to the forward and free outer terminal of the draw bar 40, by fasteners 72, is a substantially rectangular support 74 in which there is journaled for rotation a cable drum 76. One end of the cable 66 is fixed to the drum 76 and the remaining end of the cable 66 is anchored to the support 74 in any suitable manner.

An annular gear 78 is fixed to the drum 76 for rotation therewith and engages a further gear 80 that is fixed on a shaft 82. This latest shaft 82 is supported by gears or bearings 84 carried by the support 74 and includes an outwardly projecting end portion that receives a crank handle 86, see Figure 8.

The cable 66 is anchored or twisted about pins 88 extending from the projections 32, so that when the cable 64 is pulled forwardly and caught, the projections 32 will be raised and the crank portions 28 will be in a substantially horizontal position as shown best in Figure 1 of the drawings.

In order to lower the frame 10, the locking pins 36 are removed from the sleeves 38 and the crank handle 86 is actuated to pivot the projections 32 rearwardly and downwardly effecting an upward raising movement of the cranks 28 to a substantially vertical position as shown best in Figure 4 of the drawings. When in a lowered position, the leaf springs 20 will bear upon the ground and due to the positioning of the shaft 26, the rear end member 14 of the frame 10 will be moved downwardly toward and upon the ground.

Fixed to or forming an integral part of the draw bar 40, is an arcuate, substantially T-beam 90 the free end of which terminates in a socket 92 that receives a suitable clamping element 94 whereby the present boat trailer may be conveniently applied to a towing vehicle.

Arms 96 fixed to the ends of the shaft 26 support semi-cylindrical guide sleeves 98 that will engage the cable 64 when the frame 10 is disposed in a lowered position, see Figure 4, to prevent downward sagging movement of the cable 64 and to further guide the forward or longitudinal movement of the cable 64 during the raising or lowering of the frame 10.

It should be noted, that the upper concaved or inclined edges of the end members 12 and 14 are so provided as to conform to the curvature of the bottom of the boat 102 that is being supported and hauled by the frame 10, and thus prevents endwise or sidewise movement of the boat 102 relative to the frame 10 during the hauling or moving of the said boat.

Reference is now directed to Figures 9-11 inclusive, wherein there is disclosed the present invention in slightly modified form. In this embodiment, all of the parts being similar to that previously described, the cables 66 are separated or divided to provide a pair of rear sections 104, a pair of intermediate sections 106, and a forward section 108.

The rear ends of the cable sections 104 are anchored to the side members 16 and the forward ends of the rear cable sections 104 and the rear ends of the cable sections 106 are connected by resilient members or coil springs 110.

The ends of the forward cable section 108 extend under and over the pulleys 56 and 47 respectively, and are anchored to cylinders 112 having removable caps 114 that are apertured to slidably receive piston rods 116 which engage the forward terminals of the intermediate cable sections 106.

Coil springs 118 embrace the piston rods 116 and are biased between the pistons 120 thereof and the caps 114 to normally urge the pistons 120 toward the closed ends of the cylinders.

It should be noted, that in Figures 9, 10 and 11, the bearings 22 are secured to the side members 16 rather than leaf springs 20, and thus the necessity of having to provide such a resilient support means for the wheel axle or shaft 26 is eliminated. Further, stops 122 are fixed to the side members 16 to limit the rearward pivotal movement of the projections 32.

In practical use of the latest embodiment of the present invention, the crank handle is actuated to swing the projections 32 forwardly and downwardly thus moving the crank portions 28 to a substantially vertical position and the frame 10 will be lowered since the intermediate sections 106 are suitably secured to the projections 32 or in a manner previously described and as best shown in Figure 11 of the drawings by the numeral 124.

In the latest embodiment of the present boat trailer, it is obvious that the resilient members 110 and 118 will tend to reduce and absorb the normal shock prevalent to the trailer 10 as the same is moved upon a road surface and thus the resilient connectors will provide an alternate means for resiliently supporting a boat relative to the frame.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A boat trailer comprising a frame, leaf springs fixed to and depending from said frame, bearings removably secured to said leaf springs, a shaft rotatable in said bearings, said shaft having cantilever cranks, wheels carried by said cranks, said frame being disposed in a raised position when said cranks are substantially horizontal, means for locking said cranks in a substantially horizontal position, and means for manually actuating said cranks to a substantially vertical position for lowering said frame, said locking means including projections fixed to said cranks, and locking pins removably carried by said projections and bearing against said bearings.

2. A boat trailer comprising a frame, leaf springs fixed to and depending from said frame, bearings removably secured to said leaf springs, a shaft rotatable in said bearings, said shaft having canti-lever cranks, wheels carried by said cranks, said frame being disposed in a raised position when said cranks are substantially horizontal, and means for manually actuating said cranks to a substantially vertical position for lowering said frame, said means for manually actuating said cranks includes projections fixed to said cranks, flexible elements connected to said projections, guides carried by said frame for said flexible elements, and a drum for receiving said flexible elements.

3. The combination of claim 2 wherein said guides include a group of pulleys.

4. The combination of claim 2 and means for rotating said drum to wind said flexible elements thereon, said drum rotating means including a crank handle, a gear rotated by said handle, and a further gear fixed to said drum and engaging said first mentioned gear.

5. A boat trailer comprising a substantially rectangular frame, a draw bar fixed to one end of said frame, leaf springs carried by said frame, bearings adjustably mounted on said springs, a shaft rotatable in said bearings, said shaft having canti-lever terminals, wheels on the outer extremities on said canti-lever terminals, lateral projections fixed to said shaft and spaced outwardly from said frame, locking means engaged with said projections for normally retaining said canti-lever terminals in a substantially horizontal position, a cable drum carried by said draw bar, and flexible elements engaged with said projections and said drum for actuating said projection to move said canti-lever terminals to a substantially vertical position.

6. The combination of claim 5 wherein said locking means includes removable pins carried by said projections, and sleeves fixed to said bearings for receiving said pins.

ALFRED J. GETZ.

REFERENCES CITED

The following references are of record in the file of this patent:

UNITED STATES PATENTS

| Number | Name | Date |
|---|---|---|
| 2,227,762 | Ronning | Jan. 7, 1941 |
| 2,453,388 | Schramm | Nov. 9, 1948 |